US012636976B2

(12) United States Patent
Hattori

(10) Patent No.: US 12,636,976 B2
(45) Date of Patent: May 26, 2026

(54) GEAR DEVICE FOR VEHICLE SEAT

(71) Applicant: TOYOTA BOSHOKU KABUSHIKI KAISHA, Aichi (JP)

(72) Inventor: Masashi Hattori, Seto (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 18/651,966

(22) Filed: May 1, 2024

(65) Prior Publication Data

US 2024/0399934 A1    Dec. 5, 2024

(30) Foreign Application Priority Data

May 31, 2023    (JP) ................................. 2023-089893

(51) Int. Cl.
*B60N 2/02*        (2006.01)
(52) U.S. Cl.
CPC ................................ *B60N 2/02253* (2023.08)

(58) Field of Classification Search
CPC ..... F16H 1/16; B60N 2/02253; B60N 2/2251; B60N 2/2231; B60N 2/02246
See application file for complete search history.

(56) References Cited

FOREIGN PATENT DOCUMENTS

CN        213109089 U  *  5/2021
JP        2022-088151 A    6/2022

* cited by examiner

*Primary Examiner* — Victor L Macarthur
(74) *Attorney, Agent, or Firm* — Greenblum & Bernstein, P.L.C.

(57) ABSTRACT

A gear device is provided which transmits a rotational force to a movable portion of a vehicle seat. The gear device of the present disclosure includes a rotation body, a second gear, a third gear, a fourth gear, and a thrust bearing portion. The thrust bearing portion is configured to make a sliding contact with an axial end surface of a shaft protruding from the second gear. The thrust bearing portion is configured to make the sliding contact with an area of the axial end surface on a first gear side of a border portion specified in advance.

5 Claims, 12 Drawing Sheets

71B

71A

71

GEAR DEVICE FOR VEHICLE SEAT

CROSS-REFERENCE TO RELATED APPLICATIONS

This application claims the benefit of Japanese patent application No. 2023-089893 filed on May 31, 2023 with the Japan Patent Office, the entire disclosure of which is incorporated herein by reference.

BACKGROUND

The present disclosure relates to a gear device that transmits a rotational force to a movable portion of a vehicle seat.

For example, a planetary gear device disclosed in Unexamined Japanese Patent Application Publication No 2022-088151 includes a sun gear, an internal gear, a planetary gear in mesh with the sun gear and the internal gear, and carrier plates holding the planetary gear. The planetary gear is provided with annular protrusions on the inner periphery side of contact faces contactable with the respective side surfaces of the carrier plates.

SUMMARY

To limit loads imposed on a gear and/or restrict displacement of the gear in axial directions (also referred to as "thrust directions"), a thrust bearing may be provided which makes a sliding contact with the entire area of an axial end surface of the gear. In such cases, a rotational resistance may be large.

The present disclosure discloses one example of a gear device that can inhibit a rotational resistance from being large.

It is desirable that the gear device that transmits a rotational force to a movable portion of a vehicle seat comprises at least one of the following elements, for example.

The elements include: a rotation body configured to rotate integrally with a first gear and arranged coaxially with the first gear; a second gear configured to rotate in mesh with the first gear and having a rotation center axis parallel to a rotation center axis of the first gear; a third gear arranged coaxially with the second gear and configured to rotate integrally with the second gear; a fourth gear arranged coaxially with the first gear and configured to rotate in mesh with the third gear; and a thrust bearing portion arranged in the rotation body to rotate with the rotation body, and configured to make a sliding contact with an axial end surface of the second gear to restrict displacement of the second gear in an axial direction, the thrust bearing portion being configured to make the sliding contact with an area of the axial end surface on a first gear side of a border portion specified in advance.

In the gear device, the rotation body and the second gear rotate in opposite directions. In this case, the relative speed of the axial end surface of the second gear relative to the thrust bearing portion arranged in the rotation body varies from one portion to another portion of the axial end surface.

The relative speed becomes relatively small in an area of the axial end surface on the first gear side of the rotation center axis of the second gear, while the relative speed becomes relatively large in an area of the axial end surface outside of the rotation center axis of the second gear.

In a configuration such as that of the gear device in which the thrust bearing portion makes a sliding contact with an area of the axial end surface on the first gear side of the border portion specified in advance, a rotational resistance can be smaller than a rotational resistance in a configuration in which a thrust bearing portion makes a sliding contact with the enter area of the axial end surface.

The gear device may be configured as follows, for example.

It is desirable that, in a state where an imaginary circle having (i) a radius corresponding to a distance between a rotation center axis of the first gear and a rotation center axis of the second gear and (ii) a center at the rotation center axis of the first gear is defined as a path circle, the thrust bearing portion of the gear device is configured to make the sliding contact with an area of the axial end surface on a first gear side of the path circle.

The gear device has a configuration in which the border portion corresponds to the path circle. This configuration can ensure a rotational resistance smaller than a rotational resistance in a configuration in which a thrust bearing portion makes a sliding contact with the entire area of the axial end surface.

It is also desirable that the gear device comprises two or more of the second gear, and the two or more of the second gear are arranged at equal intervals on the path circle.

It is also desirable that the gear device further comprises: a gear casing housing the rotation body and the first gear to the fourth gear; a cylindrical portion arranged between the second gear and the third gear and having an even circumferential surface; and a sliding bearing portion arranged on the gear casing and configured to make a sliding contact with the circumferential surface of the cylindrical portion from an opposite side of the cylindrical portion from the first gear. This configuration can inhibit the gear device from being large, while inhibiting tilting of the second gear.

It is desirable that the gear device further comprises: a boss portion arranged on an opposite side of the third gear from the cylindrical portion; and a second sliding bearing portion arranged on the gear casing, the second sliding bearing portion being slidingly contactable with an entire area of the circumferential surface of the boss portion. This configuration can reliably inhibit the gear device from being large, while inhibiting tilting of the second gear.

Furthermore, it is desirable that: the rotation body of the gear device is a worm wheel in mesh with a worm; the worm wheel comprises a recessed portion on a side surface thereof, the recessed portion being depressed in a direction along a width of a tooth of the worm wheel; and the thrust bearing portion is arranged in a bottom portion of the recessed portion. This configuration can inhibit the gear device from being large.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

Figure 1:
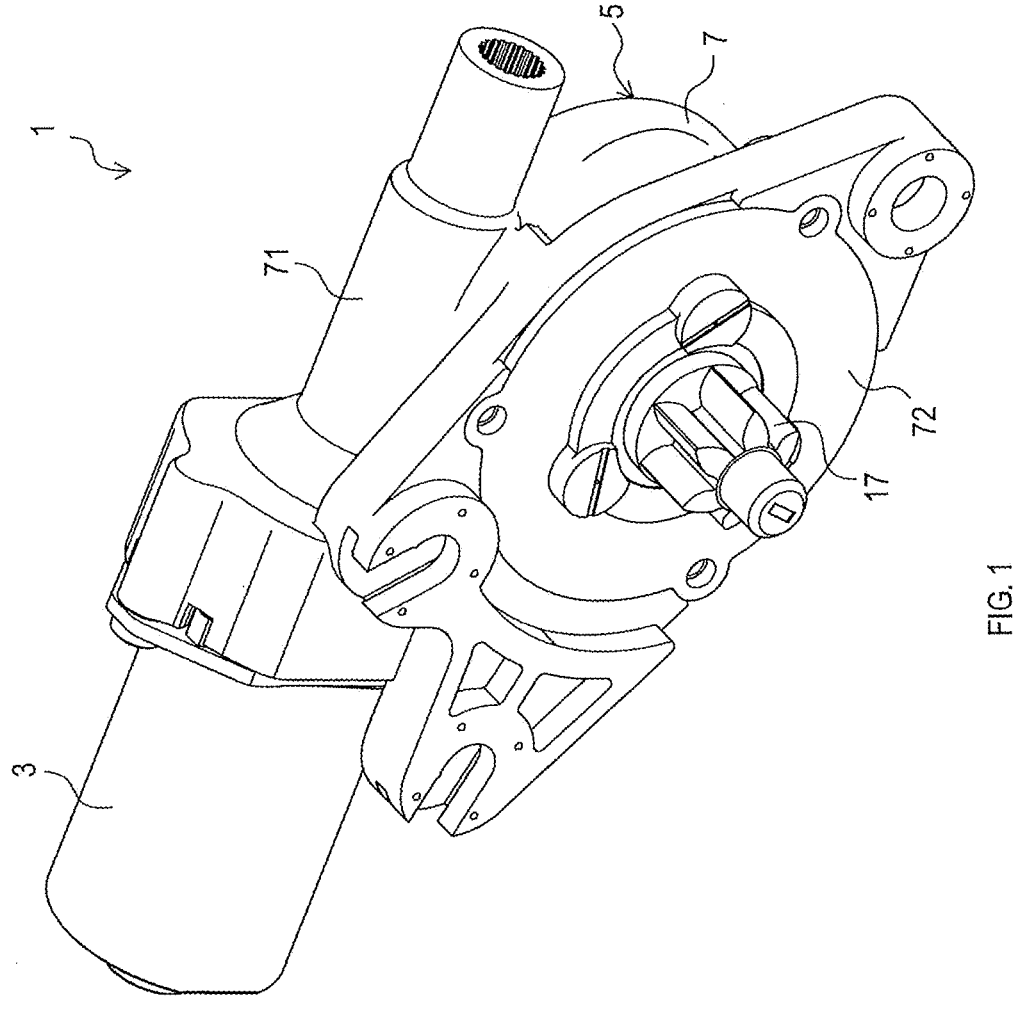
FIG. 1 is a diagram showing an electric actuator.

An "embodiment" described hereinafter shows one example of embodiments that belongs to the technical scope of the present disclosure. In other words, matters to specify the invention recited in the claims are not limited to specific configurations or structures that are shown in the embodiments described hereinafter.

The present embodiment describes an example of a seat mounted to a vehicle such as an automobile (hereinafter, to be referred to as "vehicle seat"). Arrows indicating axes and directions, hatched lines, and so on shown in the drawings are made for easy understanding of mutual relationships between the drawings, shapes of members or portions, and so on.

Thus, a gear device according the present embodiment should not be limited by axes and directions in the drawings. Axes and directions in the drawings are defined in relation to the vehicle seat according to the present embodiment that is assembled to a vehicle. Drawings including hatched lines are not necessarily cross-section views.

At least in respect of a member or portion that is labeled with a reference numeral for explanations, there is at least one in number of such a member or portion unless the number is otherwise specified as "only one of" or the like. In other words, there may be two or more of such a member or portion when the number is not specified as "only one of" or the like. The gear device according to the present disclosure comprises at least one of components such as members or portions described at least with reference numerals and structural portions shown in the drawings.

<1. Overview of Gear Device>

FIG. 1 shows an electric actuator 1 corresponding to one example of a gear device. The electric actuator 1 has a configuration in which an electric motor 3 and a gear device 5 are integrated. The electric motor 3 is a driving source that generates a rotational force.

The gear device 5 constitutes a decelerator. The gear device 5 decelerates rotation of the electric motor 3 and transmits the rotational force of the electric motor 3 to a movable portion of a vehicle seat. Examples of a movable portion of a vehicle seat include a lifter link that displaces a seat body by raising/lowering the seat body, and a tilt arm that raises or lowers a front-end side of a seat cushion.

<2. Schematic Configuration of Gear Device>

Figure 2:
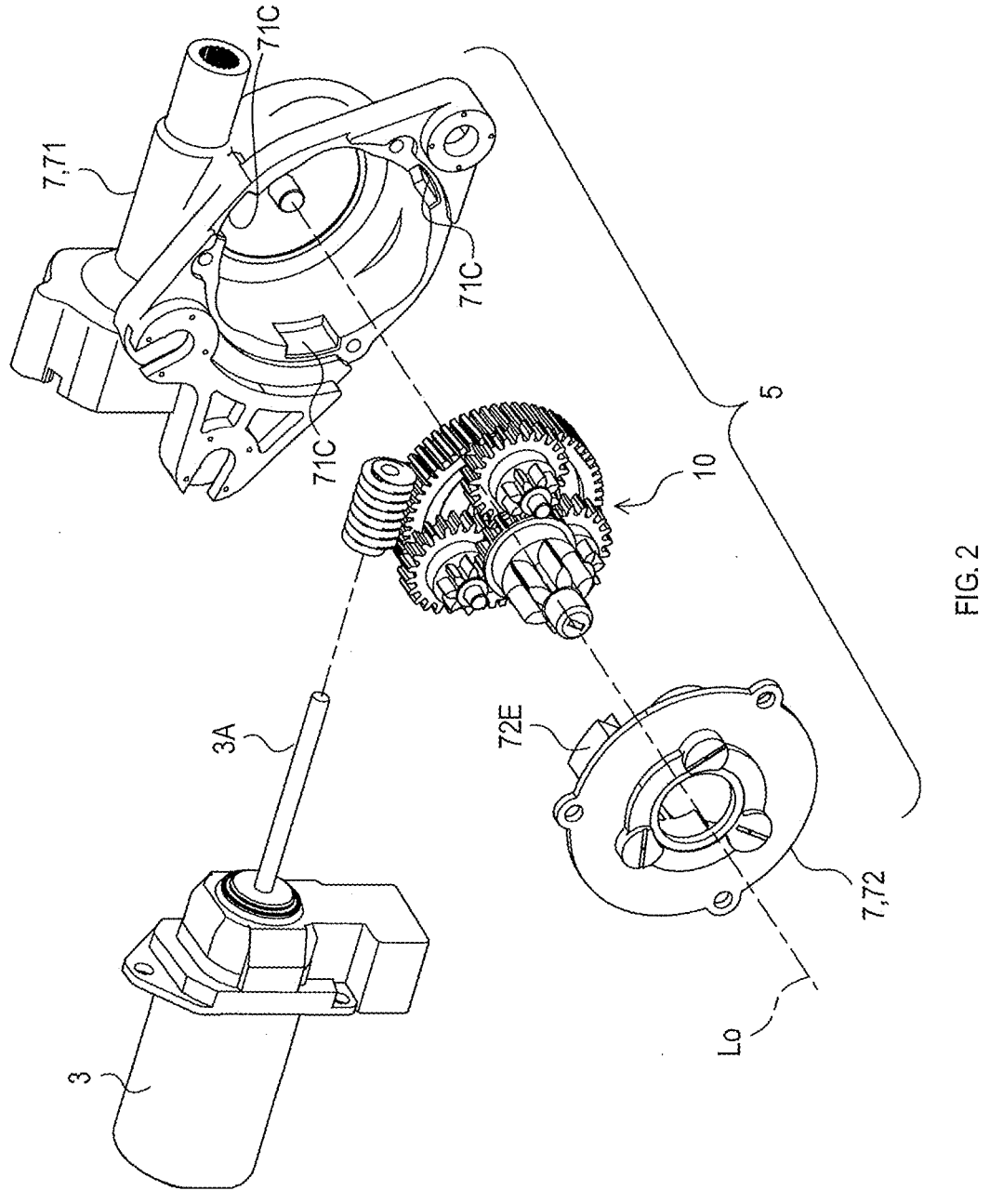
FIG. 2 is an exploded view showing the electric actuator.

As shown in FIG. 2, the gear device 5 comprises a gear casing 7 and a gear mechanism 10. The gear casing 7 houses the gear mechanism 10. The electric motor 3 is secured to the gear casing 7 with bolts (not shown).

The gear casing 7 comprises a casing body 71 and a casing cover 72. The casing body 71 and the casing cover 72 are secured to each other with two or more (three, in the present embodiment) bolts (not shown).

<2.1 Configuration of Gear Mechanism>

Figure 3:
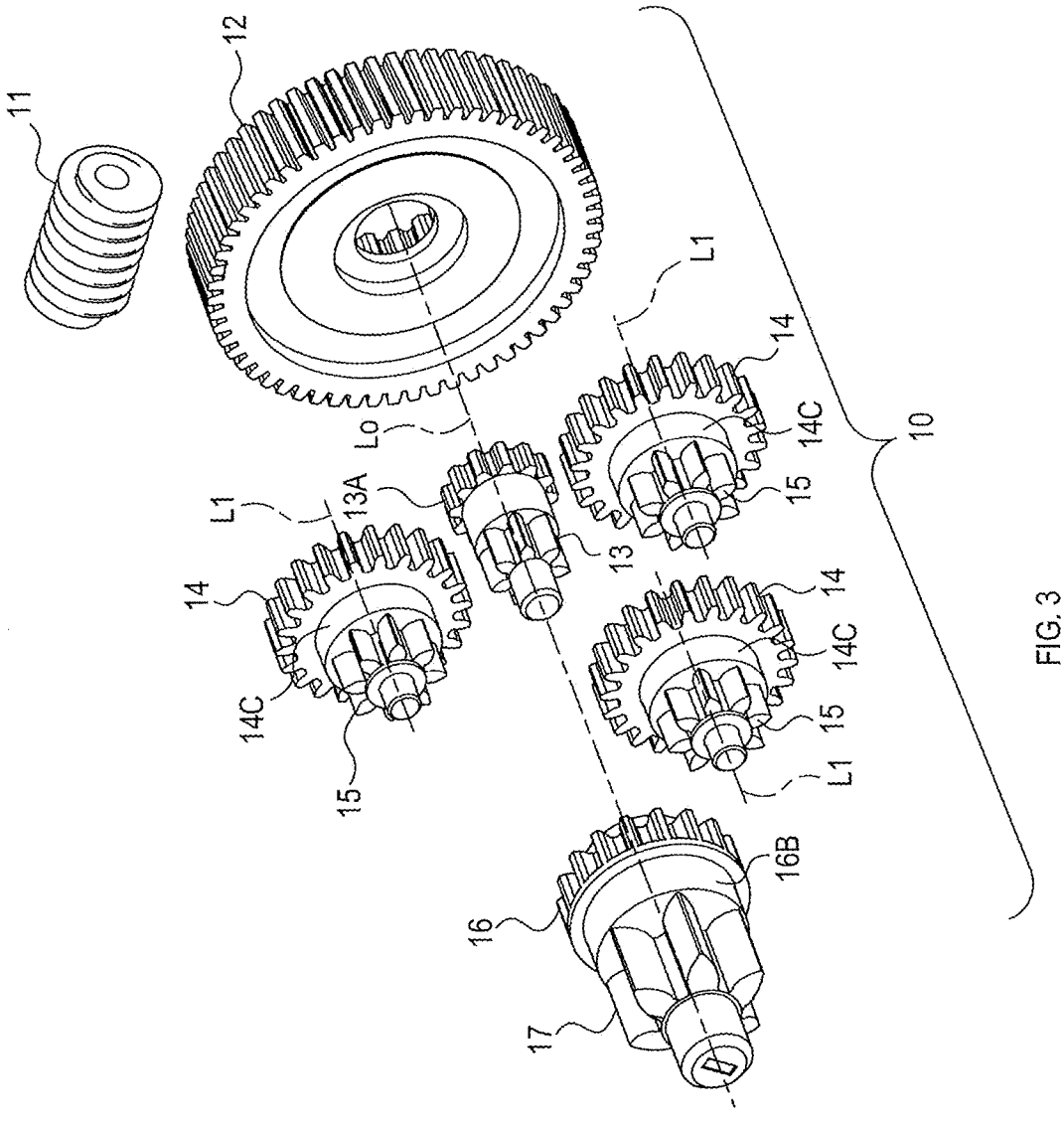
FIG. 3 is an exploded view showing a gear mechanism.

As shown in FIG. 3, the gear mechanism 10 comprises a worm 11, a worm wheel 12, a first gear 13, second gears 14, third gears 15, and a fourth gear 16.

The worm 11 is a gear in the form of a male screw secured to an output shaft 3A of the electric motor 3 (see FIG. 2). The worm wheel 12 is one example of a rotation body that meshes and rotates with the worm 11. The worm wheel 12 comprises a helical gear having a tooth-trace direction tilted with respect to a rotation center axis Lo.

The first gear 13 is arranged coaxially with the worm wheel 12 and rotates integrally with the worm wheel 12. The first gear 13 and the worm wheel 12 are coupled to each other via an engagement portion 13A, such as serrations or splines.

The second gears 14 rotate in engagement with the first gear 13. Each second gear 14 has a rotation center axis L1 parallel to the rotation center axis Lo of the first gear 13. In the present embodiment, two or more second gears 14 are provided and arranged at equal intervals on a path circle So.

The path circle So (see FIG. 7) is an imaginary circle having a radius corresponding to a distance R (see FIG. 4) between the rotation center axis Lo of the first gear 13 and the rotation center axis L1 of the second gear 14, and the center at the rotation center axis Lo of the first gear 13. In other words, the path circle So is an imaginary circle that passes through the rotation center axes L1 of the second gears 14.

As shown in FIG. 3, the third gears 15 are arranged coaxially with the second gears 14 and rotate integrally with the respective second gears 14. Thus, the third gears 15 are provided as many in number as the second gears 14. The second gear 14 and the third gear 15 are formed as a second one-piece component made of resin.

The fourth gear 16 is arranged coaxially with the first gear 13 and rotates in mesh with the third gears 15. The fourth gear 16 is integrated with an output gear 17 arranged coaxially with the fourth gear 16.

<2.2 Supporting Structure of Each Gear>

<Regarding First Gear, Fourth Gear, Etc.>

Figure 4:
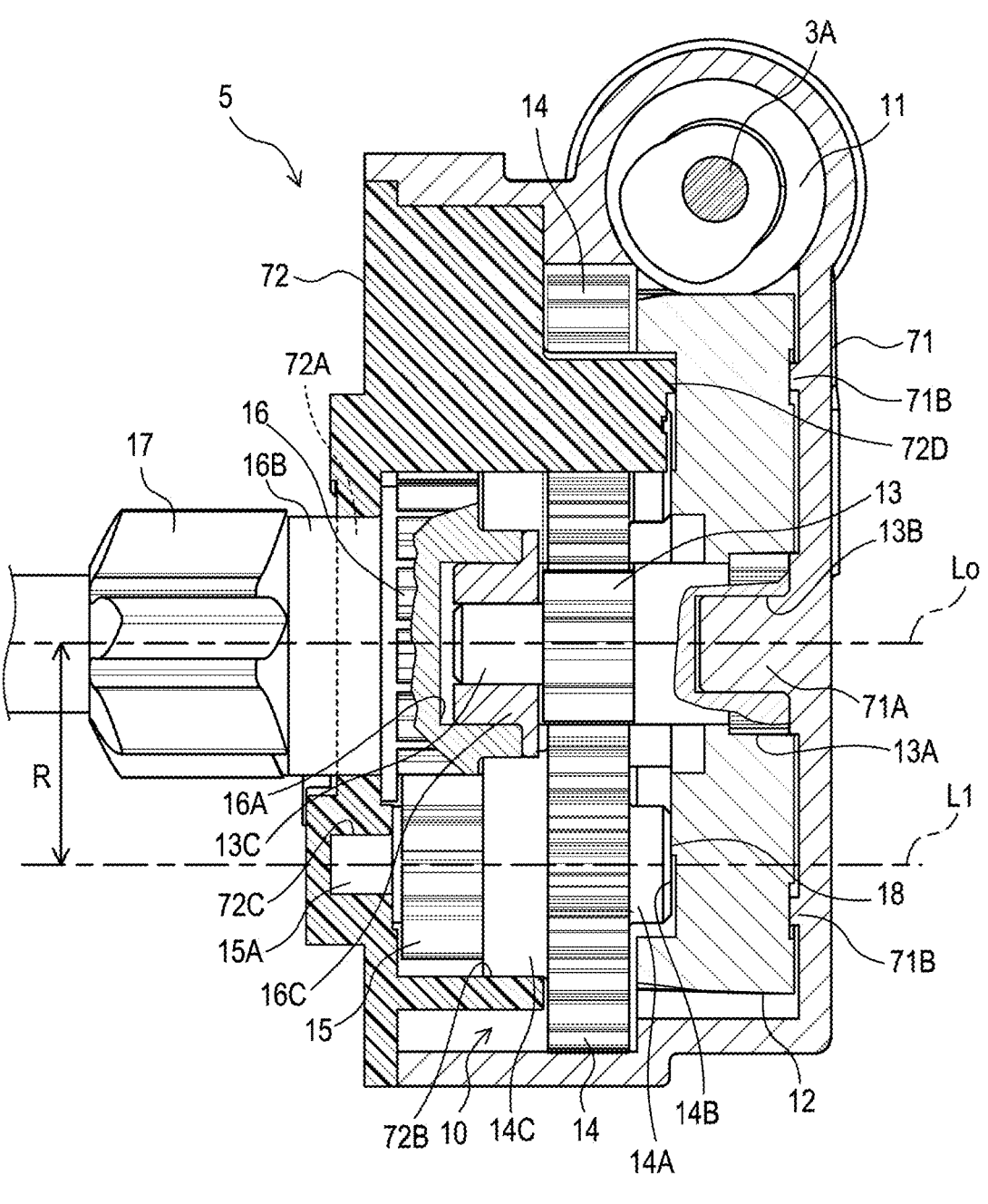
FIG. 4 is a diagram showing a structure of a gear device.

As shown in FIG. 4, the casing body 71 covers a worm wheel 12 side of the gear mechanism 10. The casing cover 72 covers a fourth gear 16 side of the gear mechanism 10. In other words, the gear mechanism 10 is interposed between the casing body 71 and the casing cover 72 in a direction along a rotation center axis L.

Figure 5:
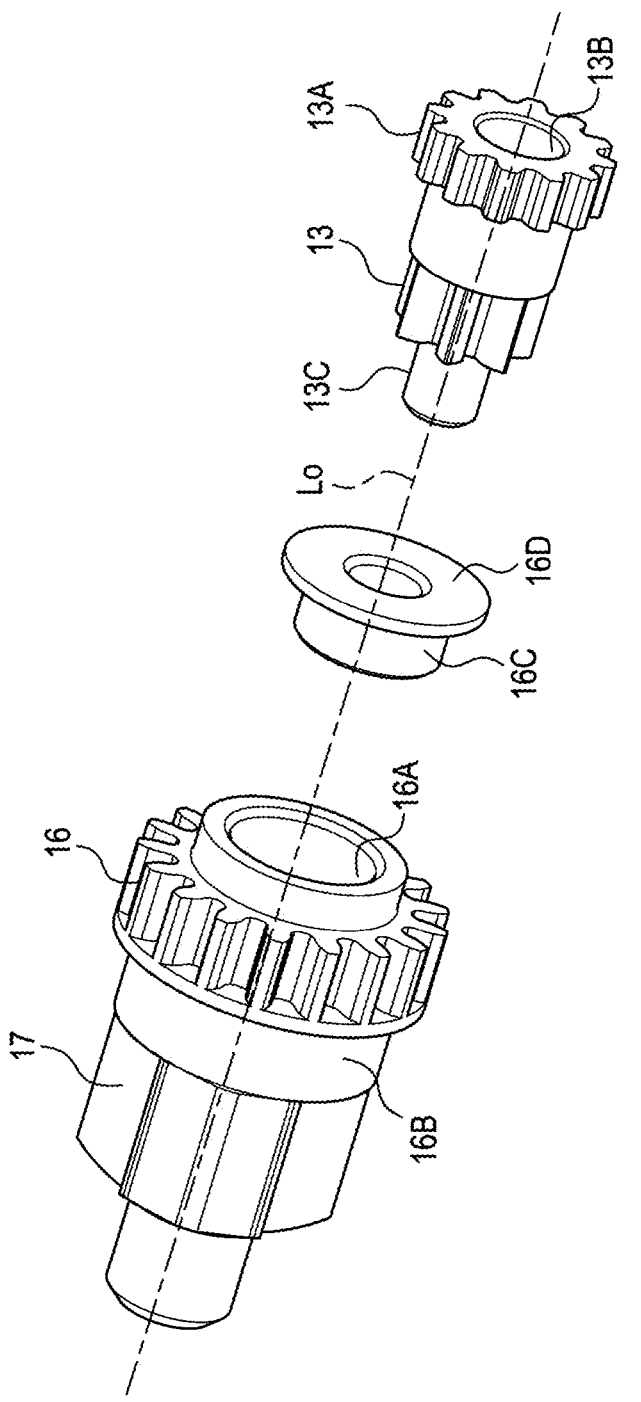
FIG. 5 is a diagram showing a first gear and a fourth gear.

The first gear 13 and the engagement portion 13A are made of metal and formed as a first one-piece component as shown in FIG. 5. The first one-piece component is provided with a cylindrically indented recessed portion 13B at a first end (at the right end in FIG. 5) in a direction along the rotation center axis of the first one-piece component. In the recessed portion 13B, a boss portion 71A is fitted as shown in FIG. 4.

The boss portion 71A is a cylindrical or tubular protrusion provided on the casing body 71 and extending toward the worm wheel 12. The outer circumferential surface of the boss portion 71A and the inner circumferential surface of the recessed portion 13B make a sliding contact with each other, thereby supporting the worm wheel 12 and the first gear 13 in a manner to allow rotation of the worm wheel 12 and the first gear 13.

The boss portion 71A constitutes a sliding radial bearing portion that supports the worm wheel 12 and the first gear 13 in a manner to allow rotation of the worm wheel 12 and the first gear 13. A radial bearing refers to a bearing that restricts displacement in directions orthogonal to the rotation center axis Lo. A sliding bearing refers to a bearing without a rolling element.

As shown in FIG. 5, the first one-piece component comprising the first gear 13 and the engagement portion 13A is provided with a boss portion 13C at a second end (at the left end in FIG. 5) in a direction along the rotation center axis of the first one-piece component. The boss portion 13C is a cylindrical or tubular protrusion extending toward the fourth gear 16.

The fourth gear 16 is provided with a cylindrically hollowed recessed portion 16A at one end on a first gear 13 side. In the recessed portion 16A, the boss portion 13C is fitted as shown in FIG. 4.

Between the outer circumferential surface of the boss portion 13C and the inner circumferential surface of recessed portion 16A, a bushing 16C is arranged which comprises a tubular portion. The bushing 16C constitutes a sliding radial bearing. This configuration enables the first gear 13 and the fourth gear 16 to rotate independently of each other.

The bushing 16C comprises a brim-shaped flange 16D positioned between the first gear 13 and the fourth gear 16 and constituting a sliding thrust bearing portion. This configuration inhibits the fourth gear 16 from being in contact with the first gear 13 and the second gears 14.

As shown in FIG. 5, a cylindrical portion 16B is provided between the fourth gear 16 and the output gear 17. The cylindrical portion 16B has an even circumferential surface (i.e., a circumferential surface without protrusions or depressions). The cylindrical portion 16B is integrated with the fourth gear 16 and the output gear 17 to form a fourth one-piece component.

Figure 6:
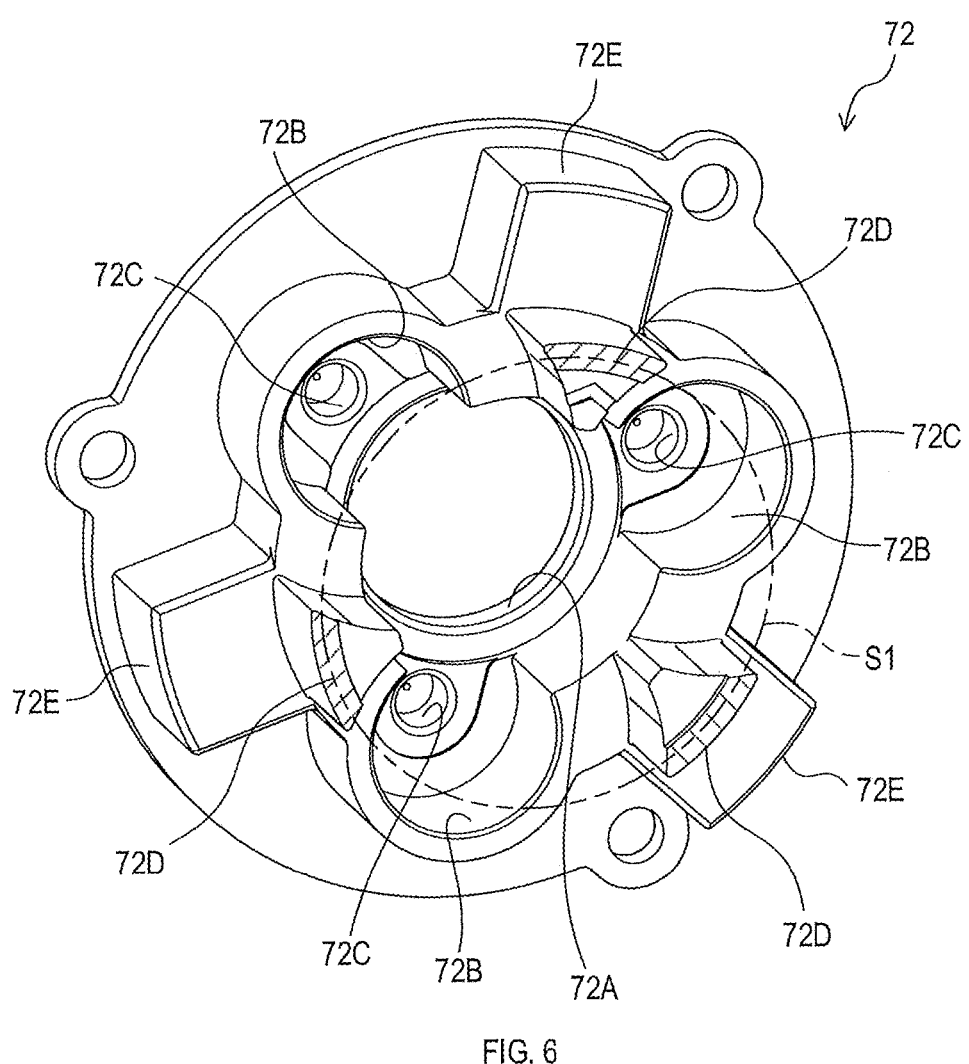
FIG. 6 is a diagram showing a casing cover.

As shown in FIG. 6, the casing cover 72 comprises a through hole 72A through which the cylindrical portion 16B can penetrate. As shown in FIG. 4, the inner circumferential surface of the through hole 72A is in contact with the cylindrical portion 16B in a slidable manner. In other words, the inner circumferential surface of the through hole 72A constitutes a sliding radial bearing portion that supports the fourth gear 16 and the output gear 17 in a manner to allow rotation of the fourth one-piece component comprising the fourth gear 16 and the output gear 17.

The first one-piece component comprising the first gear 13 and the engagement portion 13A and the fourth one-piece component comprising the fourth gear 16 and the output gear 17 are coupled via the bushing 16C. Thus, the worm wheel 12, the first gear 13, the fourth gear 16, and the output gear 17 are rotatably supported by the gear casing 7.

<Regarding Second Gear, Third Gear, Etc.>

As shown in FIG. 4, a boss portion 14A is provided on a worm wheel 12 side of each second gear 14. Each boss portion 14A is a protrusion-shaped shaft portion protruding from an end of the corresponding second gear 14 along the rotation center axis L1 toward the worm wheel 12.

Figure 7:
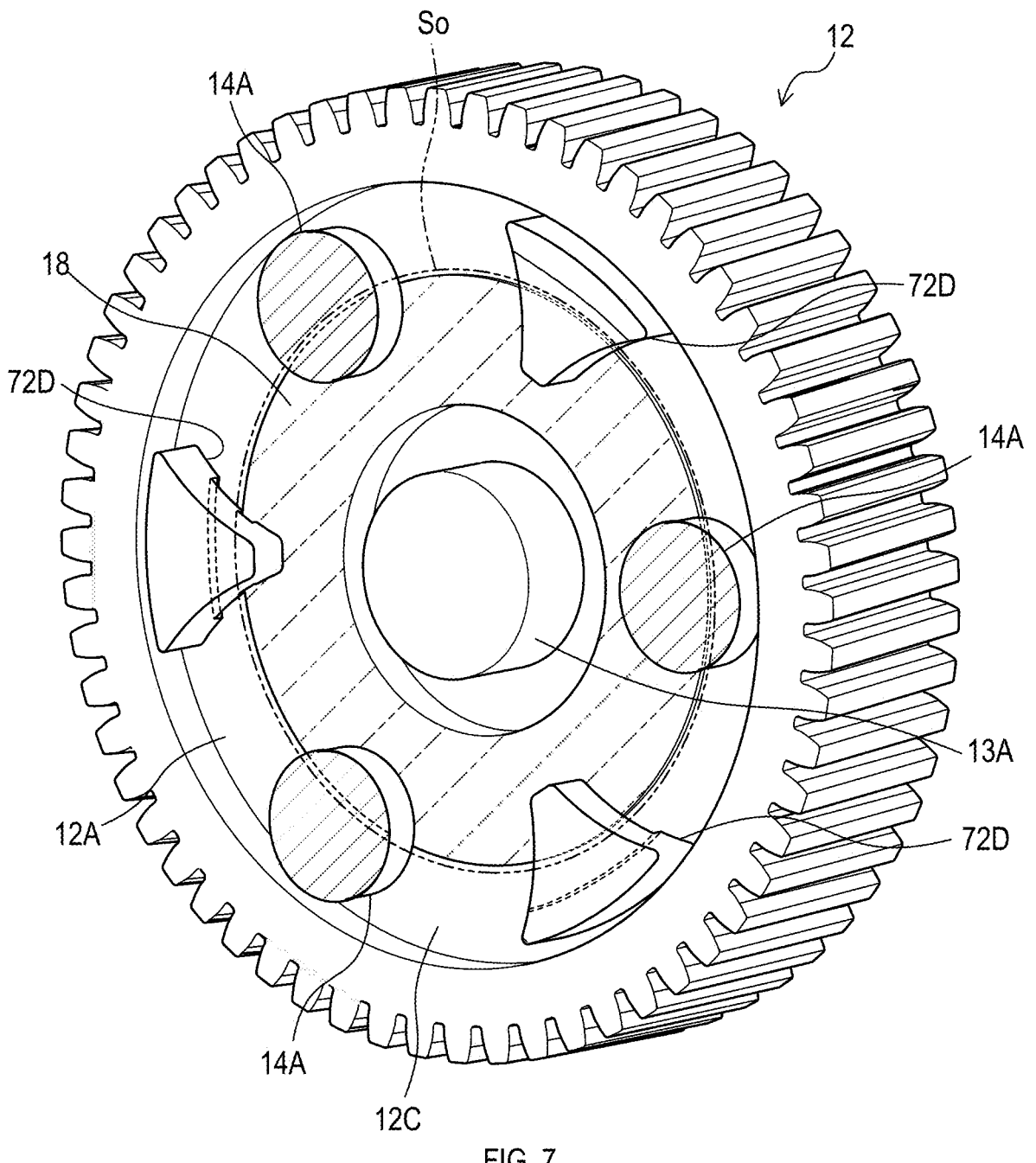
FIG. 7 is a diagram showing a worm wheel.

The axial end surface 14B of each of the second gear 14 (see FIG. 8), in other words the protruding end surface of each of the boss portions 14A, makes a sliding contact with the outer circumference side of a thrust bearing portion 18 (the portion shaded with dash-double-dot lines) shown in FIG. 7. The thrust bearing portion 18 restricts displacement of each second gear 14 in a direction along the rotation center axis L1.

The thrust bearing portion 18 is provided in the worm wheel 12, forming a third one-piece component together with the worm wheel 12, and thus rotates with the worm wheel 12. Specifically, the worm wheel 12 comprises, on a side surface thereof, a recessed portion 12A depressed in a direction along the width of teeth of the worm wheel 12.

The thrust bearing portion 18 is provided in the bottom portion of the recessed portion 12A. The thrust bearing portion 18 makes a sliding contact with an area of each axial end surface 14B on a first gear 13 side of a border portion (the path circle So in the present embodiment) specified in advance.

Specifically, the thrust bearing portion 18 is composed of an annular (doughnut-shaped) raised portion protruding from the bottom surface of the recessed portion 12A toward the second gears 14. Thus, the thrust bearing portion 18 makes a sliding contact with an area of each axial end surface 14B on a first gear 13 side of the path circle So, in other words the inside the circumferential rim of the thrust bearing portion 18.

Figure 8:
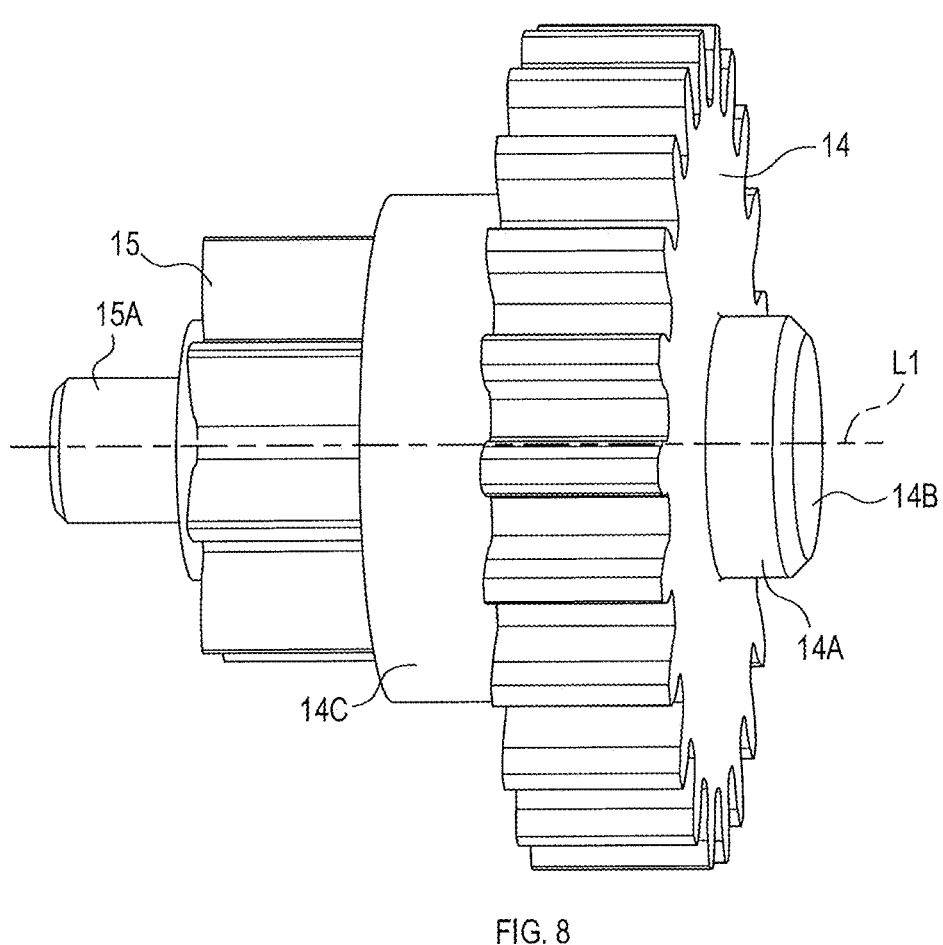
FIG. 8 is a diagram showing a second gear and a third gear.

As shown in FIG. 8, a cylindrical portion 14C is provided between each second gear 14 and the corresponding third gear 15. The cylindrical portion 14C is a cylindrical or tubular portion having an even circumferential surface. On the opposite side of the third gear 15 from the cylindrical portion 14C, a boss portion 15A is provided.

The boss portion 15A is a cylindrical or tubular portion having an even circumferential surface. In the present embodiment, the second gear 14, the third gear 15, the cylindrical portion 14C, and the boss portion 15A are integrally molded as the second one-piece component made of resin.

Figure 9:
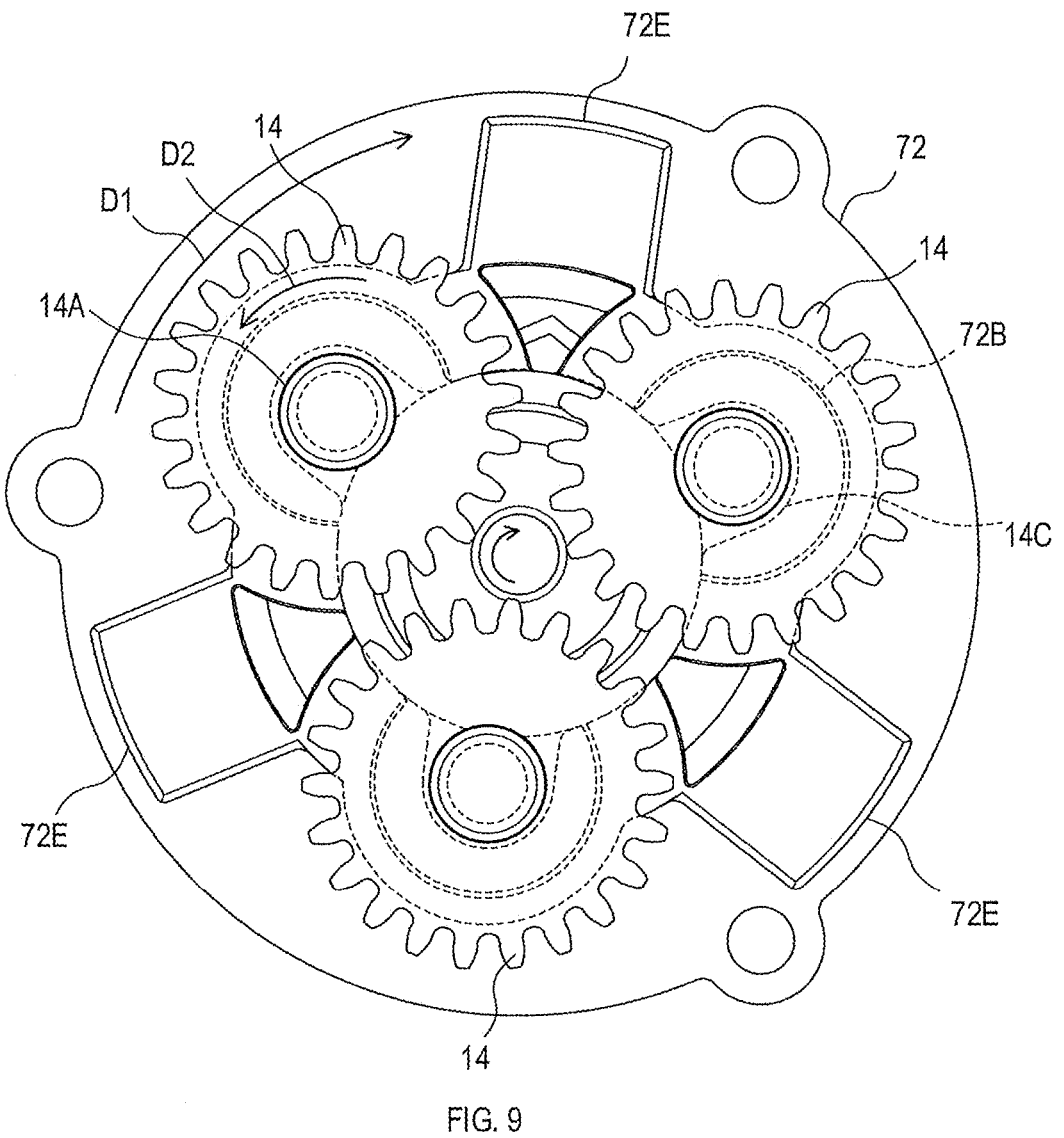
FIG. 9 is a diagram showing a structure of the gear device.

As shown in FIG. 6, the casing cover 72 comprises the same number of first sliding radial bearing portions 72B as the cylindrical portions 14C. As shown in FIGS. 4 and 9, each first sliding radial bearing portion 72B makes a sliding contact with the circumferential surface of the corresponding cylindrical portion 14C from one side of the cylindrical portion 14C opposite from the first gear 13.

In other words, each first sliding radial bearing portion 72B makes a sliding contact with the circumferential surface of the corresponding cylindrical portion 14C from radially outside of the path circle So and functions as a radial bearing that restricts radially outward displacement of each cylindrical portion 14C.

As shown in FIG. 6, the casing cover 72 further comprises second sliding radial bearing portions 72C in which the boss portions 15A can be fitted. The same number of second sliding radial bearing portions 72C as the boss portions 15A are provided. Each second sliding radial bearing portion 72C makes a sliding contact with the entire area of the circumferential surface of the corresponding boss portion 15A.

Thus, the position of the second one-piece component comprising the second gear 14 and the third gear 15 in a direction orthogonal to the rotation center axis L1 is determined by the boss portion 15A and the cylindrical portion 14C. The position of the second one-piece component in a direction along the rotation center axis L1 is determined by the sliding contact between the protruding end of the boss portion 15A and the bottom portion of the second sliding radial bearing portion 72C and the sliding contact between the axial end surface 14B of the boss portion 14A and the thrust bearing portion 18.

<Regarding Worm Wheel, Etc.>

As shown in FIG. 4, the gear casing 7 comprises a first restricting portion 71B and a second restricting portion 72D. The first restricting portion 71B and the second restricting portion 72D constitute a sliding thrust portion that restricts displacement of the worm wheel 12 in directions along the rotation center axis thereof.

Figure 10:
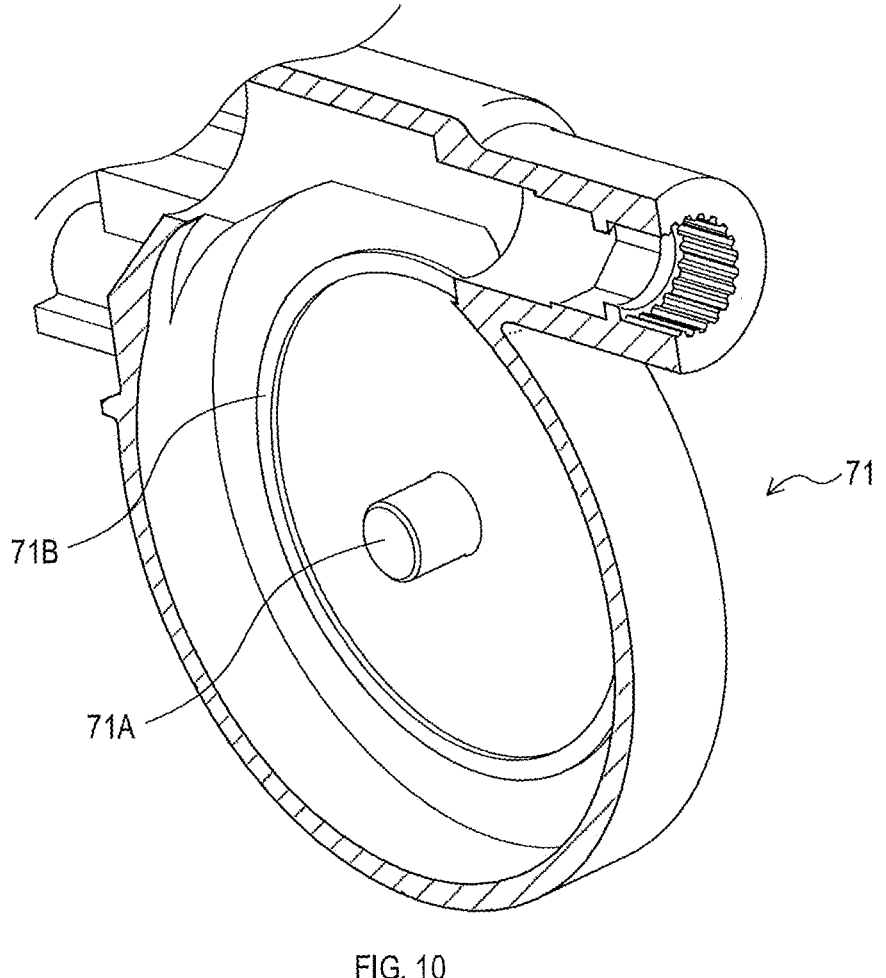
FIG. 10 is a diagram showing a casing body.
Figure 11:
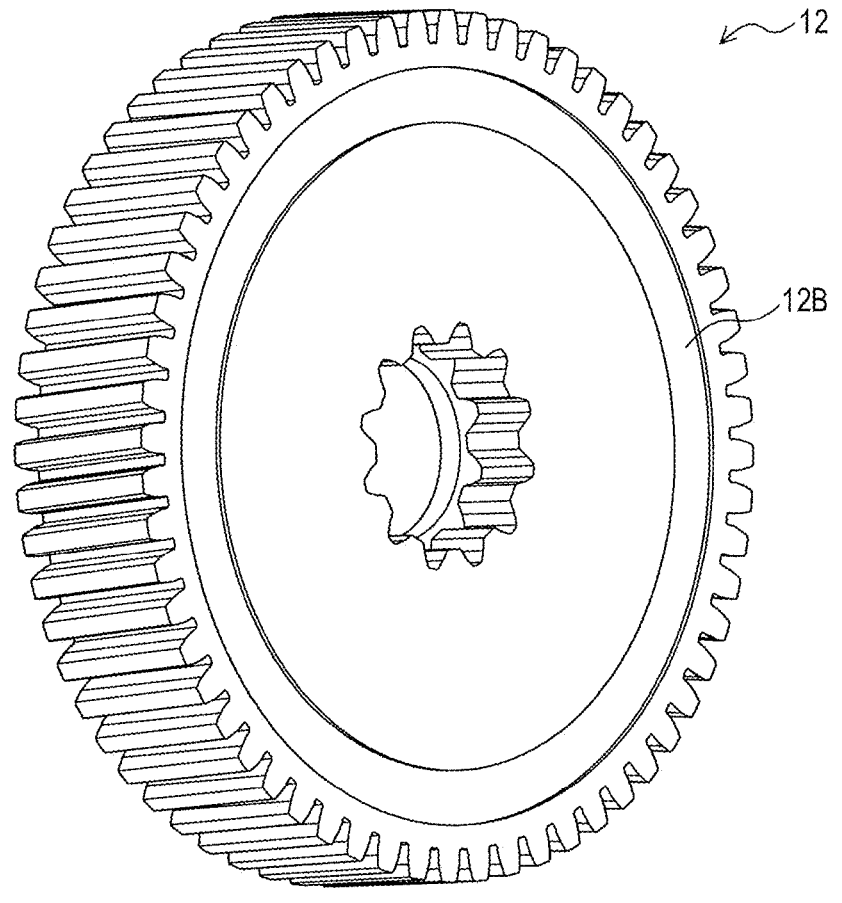
FIG. 11 is a diagram showing the worm wheel.

As shown in FIG. 10, the first restricting portion 71B is an annular portion provided on the casing body 71. The first restricting portion 71B protrudes from the inner-wall surface of the casing body 71 toward the worm wheel 12. The protruding end of the first restricting portion 71B makes a sliding contact with an annular groove 12B of the worm wheel 12 (see FIG. 11).

As shown in FIG. 6, the second restricting portion 72D is provided on the casing cover 72. The second restricting portion 72D according to the present embodiment is composed of two or more arc-shaped portions (the shaded portions in FIG. 6). The two or more arc-shaped portions, that is, two or more second restricting portions 72D are positioned on an imaginary circle S1.

As shown in FIG. 7, the second restricting portions 72D make a sliding contact with an annular contacted portion 12C arranged in the bottom portion of the recessed portion 12A. This configuration places the worm wheel 12 between the first restricting portion 71B and the second restricting portions 72D, thereby restricting displacement of the worm wheel 12 in directions along the rotation center axis thereof.

Figure 12:
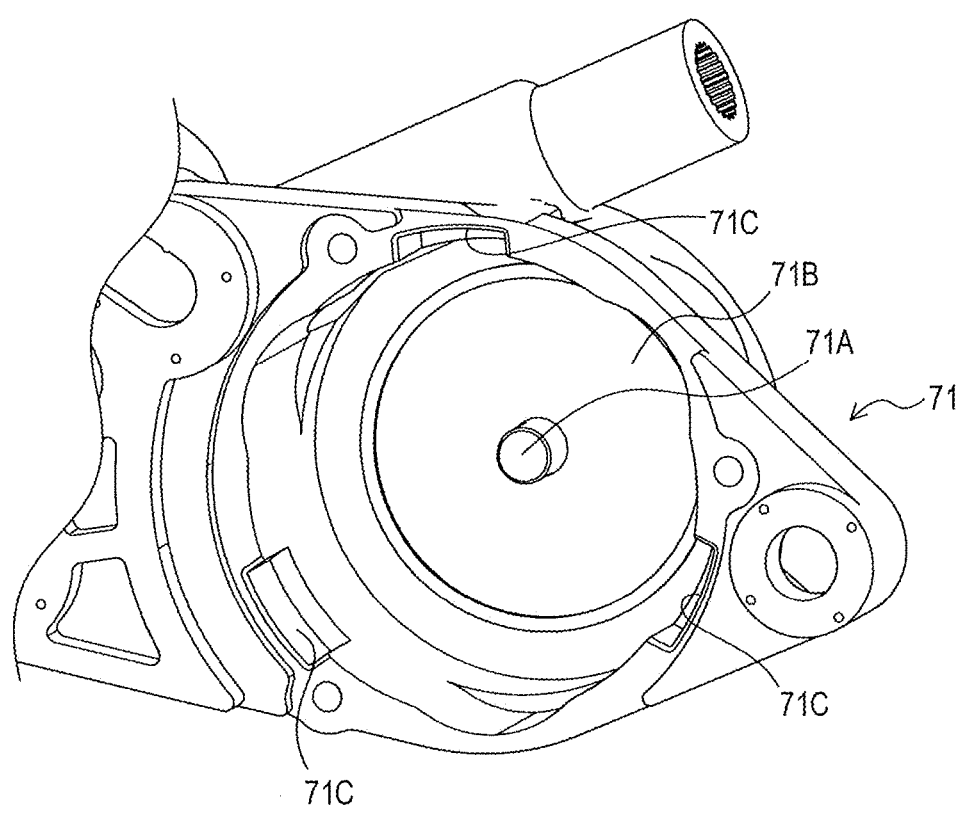
FIG. 12 is a diagram showing the casing body.

The casing body 71 also comprises a recessed portion 71C (see FIG. 12) in which a protrusion 72E (see FIG. 9) provided in the casing cover 72 can be fitted. The protrusion 72E is provided at least one (in the present embodiment, two or more) in number, and the recessed portion 71C is provided as many in number as the protrusion(s) 72E.

Each recessed portion 71C constitutes a rotation restricting portion that restricts the casing cover 72 from rotating about the rotation center axis Lo of the first gear 13. In other words, in a state where each protrusion 72E is fitted in the corresponding recessed portion 71C, the casing cover 72 is non-rotatable with respect to the casing body 71.

<3. Features of Gear Device of Present Embodiment>

In the gear device 5 according to the present embodiment, the worm wheel 12 rotates in a direction D1 as shown in FIG. 9, and the second gears 14 rotate in a direction D2 which is opposite to the direction D1. In this configuration, the relative speed of the axial end surfaces 14B of the second gears 14 relative to the thrust bearing portion 18 provided in the worm wheel 12 varies from one portion to another portion of each axial end surface 14B.

Specifically, in a broad view, the relative speed becomes relatively small in an area of each axial end surface 14B on a first gear 13 side of the rotation center axis L1 of the corresponding second gear 14, while the relative speed becomes relatively large in an area of each axial end surface 14B outside of the rotation center axis L1 of the corresponding second gear 14.

Thus, in a configuration such as that of the gear device 5 in which the thrust bearing portion 18 makes a sliding contact with an area of each axial end surface 14B on the first gear 13 side of the border portion specified in advance, a rotational resistance can be smaller than in a configuration in which a thrust bearing portion makes a sliding contact with the enter area of the axial end surface 14B.

The thrust bearing portion 18 makes a sliding contact with an area of each axial end surface 14B on the first gear 13 side of the path circle So. That is, the border portion corresponds to the path circle So in the gear device 5. This configuration can ensure a rotational resistance smaller than a rotational resistance in a configuration in which a thrust bearing portion makes a sliding contact with the entire area of each axial end surface 14B.

The gear casing 7 comprises the first sliding radial bearing portions 72B each of which makes a sliding contact with the circumferential surface of the cylindrical portion 14C from one side of the cylindrical portion 14C opposite from the first gear 13. This configuration can inhibit the gear device 5 from being large, while inhibiting tilting of the second gears 14. In addition, this configuration can maintain the second gears 14 and the third gears 15 in appropriate orientation and location.

The gear casing 7 comprises the second sliding radial bearing portion 72C each of which can make a sliding contact with the entire area of the circumferential surface of the corresponding boss portion 15A. This configuration can reliably inhibit the gear device 5 from being large, while inhibiting tilting of the second gears 14. In addition, this configuration can reliably maintain the second gears 14 and the third gears 15 in appropriate orientation and location.

Furthermore, in the gear device 5, the thrust bearing portion 18 is provided in the bottom portion of the recessed portion 12A formed on the side surface of the worm wheel 12. This configuration can inhibit the gear device 5 from being large.

In the gear device 5, the gear casing 7 comprises the first restricting portion 71B and the second restricting portions 72D that restrict displacement of the worm wheel 12 in directions along the rotation center axis thereof. The first restricting portion 71B and the second restricting portions 72D can make sliding contacts with the worm wheel 12.

Thus, the gear device 5 is configured without a part corresponding to a holder (also referred to as "carrier") of a planetary gear device. This can reduce the number of components of the gear device 5 and the size of the gear device 5.

OTHER EMBODIMENTS

In the above-described embodiment, the thrust bearing portion 18 is configured to make a sliding contact with an area of each axial end surface 14B on the first gear 13 side of the path circle So. However, the present disclosure is not limited to this configuration. For example, the border portion may be other than the outer periphery rim of the path circle So.

The thrust bearing portion 18 according to the above-described embodiment has a disk shape (see FIG. 7). However, the present disclosure is not limited to this shape. For example, the thrust bearing portion 18 may have a ring shape.

In the above-described embodiment, the two or more second gears 14 are arranged on the path circle So at equal intervals. However, the present disclosure is not limited to this configuration. For example, there may be only one second gear 14 provided in an alternative configuration.

In the above-described embodiment, the gear casing 7 comprises the first sliding radial bearing portions 72B each of which makes a sliding contact with the circumferential surface of the cylindrical portion 14C from one side of the cylindrical portion 14C opposite from the first gear 13. However, the present disclosure is not limited to this configuration.

In the above-described embodiment, the gear casing 7 comprises the second sliding radial bearing portions 72C each of which can make a sliding contact with the entire area of the circumferential surface of the corresponding boss portion 15A. However, the present disclosure is not limited to this configuration. For example, the gear casing 7 need not have the second sliding radial bearing portions 72C.

In the above-described embodiment, the thrust bearing portion 18 is provided in the bottom portion of the recessed portion 12A formed on the side surface of the worm wheel 12. However, the present disclosure is not limited to this configuration. For example, the worm wheel 12 need not have the recessed portion 12A.

The above-described embodiment describes an example of an automobile seat. However, the present disclosure can also be applied to seats used in other vehicles, such as railway vehicles, ships, and airplanes, and to stationary seats used at theaters, homes, and so on.

Furthermore, the present disclosure should not be limited to the above-described embodiments as long as it falls within the spirit of the disclosure described in the above-described embodiments. Thus, the present disclosure may be configured in combination of at least two of the above-described embodiments or may be the above-described embodiment(s) configured without either the elements shown in the drawings or the elements described with reference numerals.

What is claimed is:

1. A gear device configured to transmit a rotational force to a movable portion of a vehicle seat, the gear device comprising:

a rotation body configured to rotate integrally with a first gear and arranged coaxially with the first gear;

a second gear configured to rotate in mesh with the first gear and having a rotation center axis parallel to a rotation center axis of the first gear;

a third gear arranged coaxially with the second gear and configured to rotate integrally with the second gear;

a fourth gear arranged coaxially with the first gear and configured to rotate in mesh with the third gear; and a thrust bearing portion arranged in the rotation body to rotate with the rotation body, and making a sliding contact with an axial end surface of the second gear to restrict displacement of the second gear in an axial direction, wherein, a path circle is defined by (i) a radius equal to a distance between the rotation center axis of the first gear and the rotation center axis of the second gear and (ii) a center at the rotation center axis of the first gear, the thrust bearing portion making the sliding contact with an area of the axial end surface that is radially-inward of the path circle.

2. The gear device according to claim 1, wherein the gear device comprises two or more of the second gear, the two or more of the second gear being arranged at equal intervals on the path circle.

3. The gear device according to claim 1, wherein the rotation body is a worm wheel in mesh with a worm, wherein the worm wheel comprises a recessed portion on a side surface thereof, the recessed portion being depressed in a direction along a width of a tooth of the worm wheel, and wherein the thrust bearing portion is arranged in a bottom portion of the recessed portion.

4. A gear device configured to transmit a rotational force to a movable portion of a vehicle seat, the gear device comprising:

a rotation body configured to rotate integrally with a first gear and arranged coaxially with the first gear;

a second gear configured to rotate in mesh with the first gear and having a rotation center axis parallel to a rotation center axis of the first gear;

a third gear arranged coaxially with the second gear and configured to rotate integrally with the second gear;

a fourth gear arranged coaxially with the first gear and configured to rotate in mesh with the third gear; and a thrust bearing portion arranged in the rotation body to rotate with the rotation body, and making a sliding contact with an axial end surface of the second gear to restrict displacement of the second gear in an axial direction, the thrust bearing portion making the sliding contact with an area of the axial end surface that is radially-inward of a path circle defined by (i) a radius equal to a distance between the rotation center axis of the first gear and the rotation center axis of the second gear and (ii) a center at the rotation center axis of the first gear, the gear device further comprising:

a gear casing housing the rotation body and the first gear to the fourth gear;

a cylindrical portion arranged between the second gear and the third gear and having an even circumferential surface; and a sliding bearing portion arranged on the gear casing and configured to make a sliding contact with the circumferential surface of the cylindrical portion from an opposite side of the cylindrical portion from the first gear.

5. The gear device according to claim 4, further comprising:

a boss portion arranged on an opposite side of the third gear from the cylindrical portion; and a second sliding bearing portion arranged on the gear casing, the second sliding bearing portion being slidingly contactable with an entire area of the circumferential surface of the boss portion.

* * * * *